(12) United States Patent
Huang et al.

(10) Patent No.: US 6,540,968 B1
(45) Date of Patent: Apr. 1, 2003

(54) LOW-PRECIOUS METAL/HIGH-RARE EARTH OXIDE CATALYSTS

(75) Inventors: Rongguang Huang, Kunming (CN); Jun Li, Melvindale, MI (US); Ronald G. Hurley, Canton, MI (US)

(73) Assignees: Ford Global Technologies, Inc., Dearborn, MI (US); Kumming Institute of Precious Metals, Kumming (CH)

( * ) Notice: Subject to any disclaimer, the term of this patent is extended or adjusted under 35 U.S.C. 154(b) by 96 days.

(21) Appl. No.: 09/314,202

(22) Filed: May 19, 1999

(51) Int. Cl.$^7$ .............. B01J 8/02; B01J 23/00; C01B 21/00; C01B 23/00
(52) U.S. Cl. ............... 423/213.5; 502/303; 502/304
(58) Field of Search ............ 423/213.5; 502/303, 502/304

(56) References Cited

U.S. PATENT DOCUMENTS

| | | | | |
|---|---|---|---|---|
| 4,528,279 A | * | 7/1985 | Suzuki | 423/213.5 |
| 4,714,694 A | * | 12/1987 | Wan et al. | 502/304 |
| 4,743,576 A | | 5/1988 | Schneider et al. | 502/242 |
| 4,818,433 A | * | 4/1989 | Sigai | 252/301.4 R |
| 4,843,056 A | | 6/1989 | Matsumoto et al. | 502/302 |
| 4,931,419 A | | 6/1990 | Blanchard et al. | 502/304 |
| 5,102,850 A | | 4/1992 | Sanchez | 502/261 |
| 5,134,107 A | * | 7/1992 | Narula | 502/303 |
| 5,179,059 A | * | 1/1993 | Domesle | 423/213.5 |
| 5,292,991 A | * | 3/1994 | Lachman | 423/213.5 |
| 5,378,142 A | | 1/1995 | Kennelly et al. | 431/7 |
| 5,474,965 A | | 12/1995 | Nakatsuji et al. | 502/330 |
| 5,753,581 A | | 5/1998 | Backmeyer et al. | 502/304 |

FOREIGN PATENT DOCUMENTS

| | | |
|---|---|---|
| EP | 0-834-348 A2 | 10/1997 |
| JP | 08-057312 | * 3/1996 |

OTHER PUBLICATIONS

G. W. Graham, et al; Investigation of $La^{3+}$–modified $Al_2O_3$– supported $CeO_2$; Aug. 11, 1992; pp. 175–184.

* cited by examiner

Primary Examiner—Stanley S. Silverman
(74) Attorney, Agent, or Firm—Damian Porcari

(57) ABSTRACT

The invention is a three-way catalyst, its method of manufacture, and use for treating exhaust gas generated by a gasoline internal combustion engine. The method comprises coating a substrate with mixed metal oxide particles in an amount of 10–30 wt. % based on the weight of the substrate. The mixed metal oxide comprises at least aluminum and rare earth metals of cerium and lanthanum. Precious metals are then deposited on the oxide coating and comprise at least one of platinum and palladium overcoated with rhodium. The total loading of precious metals is about 5–35 g/ft$^3$ of the substrate.

18 Claims, 1 Drawing Sheet

LOW-PRECIOUS METAL/HIGH-RARE EARTH OXIDE CATALYSTS

FIELD OF THE INVENTION

The invention is directed to a method for manufacturing a cost-reduced, durable three-way catalyst useful to oxidize hydrocarbons, carbon monoxide and reduce nitrogen oxides in exhaust gas generated by a gasoline internal combustion engine operated near the stoichiometric A/F ratio. More particularly, the catalyst comprises a mixed metal oxide of aluminum and rare earths impregnated with precious metal of platinum and/or palladium overlaid with rhodium.

BACKGROUND OF THE INVENTION

Catalysts are employed in the exhaust systems of automotive vehicles to convert carbon monoxide, hydrocarbons, and nitrogen oxides (NOx) produced during engine operation into nonpolluting gases including carbon dioxide, moisture ($H_2O$), and nitrogen. When the gasoline powered engine is operated in a stoichiometric or slightly rich air/fuel ratio, i.e., between about 14.7 and 14.4, catalysts containing precious metals like platinum, palladium and rhodium are able to efficiently convert all three gases simultaneously. Hence, such catalysts are often called "three-way" catalysts. Typically such catalysts use a relatively high loading of precious metal to achieve the high conversion efficiency required to meet stringent emission standards of many countries. This makes the catalyst expensive. In countries where the emission standards are less stringent, a durable catalyst which would meet these less stringent standards and also be less expensive catalyst would be desirable.

We have now found a method for making a durable three-way catalyst which has a significantly lower loading of precious metal than conventional catalysts making it less expensive, but which still obtains excellent exhaust gas conversion efficiency under close to stoichiometric conditions. It includes an aluminum-rare earth (mixed metal) oxide carrying precious metal in a particular arrangement, where a relatively high loading of rare earths is combined with a relatively low loading of precious metal. This and other aspects of the invention will be discussed in detail below.

DISCLOSURE OF THE INVENTION

The invention is a method for manufacturing a durable three-way catalyst useful for treating gasoline engine exhaust gases containing hydrocarbons, carbon monoxide, and nitrogen oxides (NOx) . The catalyst has a relatively high loading of rare earths and low precious metals which reduces its cost.

The invention method comprises first coating a substrate with oxide particles comprising (1) a mixed metal oxide and, optionally, (2) 0 to 8 wt. % oxide stabilizers based on the weight of the mixed metal oxide, the metals of the mixed metal oxide consisting essentially of aluminum and rare earth metals. The oxide is coated on the substrate in an amount of 10–30 wt. %, based on the weight of the substrate. In this oxide coating, the rare earth metals comprise cerium (Ce) and lanthanum (La) and, calculating La as $La_2O_3$, Ce as $CeO_2$ and Al as $Al_2O_3$, the La is 40–70 wt. % of La+Ce and the rare earth metals are 20–60 wt. % of the weight of the Al+rare earth metals. Then according to the method, precious metal is deposited on the oxide coating, wherein first at least one of platinum and palladium are deposited and then an overlayer of rhodium is deposited, in an amount of about 5–35 g/ft³ based on the volume of the substrate.

The catalyst of the present invention thus contains a significant excess of rare earth oxide as compared to precious metal. It is critical to the present invention that the aluminum and rare earths be incorporated in a mixed metal oxide, i.e., the metal atoms are attached to the same or different oxygen atoms in the lattice of the oxide. One preferred way to form the mixed metal oxide is by co-precipitation from a solution as will be discussed herein in detail. According to another aspect of the invention, it is the catalyst made by the process disclosed above and yet another aspect is the method of treating exhaust gases generated by a stoichiometric gasoline engine with the catalyst by contacting the gas with the catalyst.

PREFERRED EMBODIMENTS OF THE INVENTION

Figure 1:
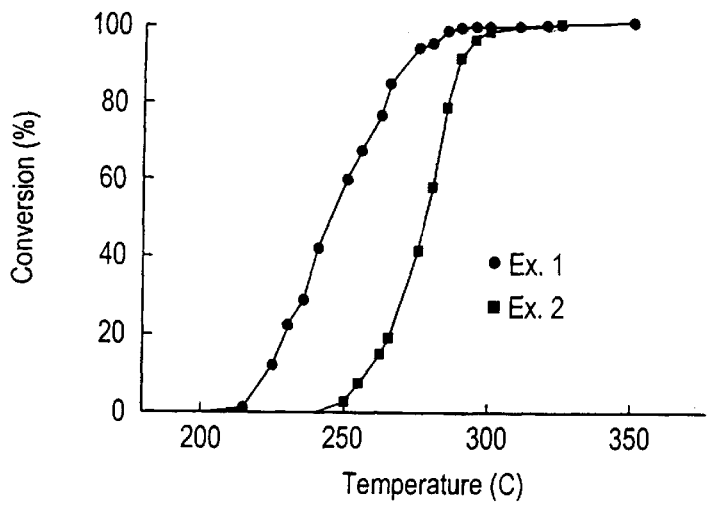
FIG. 1 is a graph showing the light-off behavior of catalysts made by a preferred embodiment of the present invention with a mixed metal oxide and, for comparison, a catalyst made by merely mixing together metal oxides.

The present invention method for manufacturing a durable, low cost three-way catalyst involves washcoating a substrate with particles of a mixed metal oxide and then providing precious metals on the washcoat. The washcoat may also include particles of stabilizers for the mixed metal oxide in a substantially uniform admixture with the mixed metal oxide particle. The metals of the mixed metal oxide are aluminum and rare earth metals. By "mixed metal oxide" as used herein is meant that the metals are present in the lattice of the mixed metal oxide such that the metals may be attached to the same or different oxygen atoms in the oxide lattice. It is not merely a mixture of aluminum oxide particles with rare earth oxide particles. Rather, they are part of the same oxide. This aspect of the mixed metal oxide is considered critical to the invention. Such a mixed metal oxide was unexpectedly found to provide superior catalyst efficiency as compared to a similar catalyst made instead using separate particle of aluminum oxide and rare earth oxides merely mixed together. It is believed that the close atomic proximity of the metal atoms within the oxide lattice and optimally a relatively uniform dispersion contributes to the improved HC, CO, and NOx efficiency. Neither the truth nor the understanding of this theory is necessary for practice of the invention. It is provided in an attempt to explain the unexpected superior properties of the present invention catalyst.

One way to make the mixed metal oxide is by co-precipitation from a solution of soluble salts of the various metals, co-precipitation techniques being well known to those skilled in the art. According to such techniques, the soluble salts can be dissolved in a solvent, for example, nitrates of aluminum and nitrates of the rare earths being dissolved in water, and then co-precipitation obtained by making the solution basic, e.g., a pH of 9, by adding a base like ammonium hydroxide. Other soluble metal compounds such as, for example, sulfates and chlorides, may be used as may mixtures or various soluble compounds, e.g., nitrates with chlorides. The precipitate would then be heated to decompose it to the mixed metal oxide. This heating or calcination usually would be carried out at up to 500° C. The way in which the oxide is obtained for use in forming the catalyst is not critical to the invention. Still other ways and soluble salts would be apparent to one skilled in the art in view of the present disclosure.

As stated above, the metals forming the mixed metal oxide are at least aluminum, cerium and lanthanum but may include other rare earth metals like europium and praseodymium. In the mixed metal oxide, the amounts of the various metals relative to one another are important, and for the following weight percents, are based on the metal oxides. That is aluminum is calculated as aluminum oxide ($Al_2O_3$), lanthanum is calculated as lanthanum oxide ($La_2O_3$), cerium is calculated as cerium oxide ($CeO_2$), europium is calculated as europium oxide ($Eu_2O_3$), and praseodymium is calculated as praseodymium oxide ($PrO_2$). In the mixed metal oxide, the rare earth metals (calculated as their oxides as described above) are 20–60 wt. % of the weight of the mixed metal oxide (i.e., considering the total of the aluminum oxide and rare earth oxides). As stated above, the rare earth metals include at least cerium and lanthanum, where lanthanum (calculated as its oxide) is 40–70 wt. % of the total of cerium and lanthanum (calculated as their oxides). Optionally up to about 2 wt. % of other rare earth metals may be in the mixed metal oxide, for example, europium and/or praseodymium, as for the other rare earth metals, this wt. % being given calculated as their oxides. Optimally, the mixed metal oxide particles are mixed to form a substantially uniform mixture with stabilizer for the oxide, most preferably when included, in about 0.5 to 8 wt. %, based on the weight of the mixed metal oxide. Selection of such oxide stabilizers would be well known to those skilled in the art in view of the present disclosure. Examples of such oxide stabilizers include thermal stabilizers like titanium, zirconium or barium oxide, while structural stabilizers include for example, titanium and calcium oxide. The mixed metal oxide is mixed with the stabilizers, e.g., as by milling in a slurry.

In forming the washcoat to be applied to the substrate, the size of the particles of mixed metal oxide and stabilizer materials (when included) is optimally, on average, less than 1000 Angstroms, more preferably on average, of 200 to 900 Angstroms, and most preferably, the particle size is between 500 and 700 Angstroms. As the particle size of the washcoat particles decreases, the catalyst is more efficient in contacting the exhaust gas.

As is known in the art, for useful application of the catalyst in an exhaust gas system, the catalyst is deposited or washcoated on a substrate (mechanical carrier) made of a high temperature stable, electrically insulating material such as cordierite, mullite, etc. A mechanical carrier is preferably comprised of a monolithic magnesium aluminum silicate structure (i.e., cordierite), although the configuration is not critical to the catalyst of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

Techniques for providing an oxide washcoat on a substrate is well known to those skilled in the art. Generally a slurry of the mixed metal oxide particles and optionally stabilizer particles is coated on a substrate, e.g., as by dipping or spraying, after which the excess is generally blown off. Then it is heated to dry and calcine the coating, generally a temperature of about 700° C. for about 2–3 hours may be used. Calcining serves to develop the integrity of the ceramic structure of the washcoated oxide coating. The total amount of the oxide washcoat carried on the substrate is about 10–30 wt. %, based on the weight of the substrate coated. Several coatings of the substrate in the washcoat may be necessary to develop the desired coating thickness/weight on the substrate.

According to the present invention, the washcoated mixed metal oxide coating on the substrate is then provided with at least about 5–35 $g/ft^3$ of precious metal based on the volume of the substrate, more preferably being 10–30 $g/ft^3$. Most preferably, the total loading of precious metal on the oxide washcoat is 10–16 $g/ft^3$. In the invention, the precious metal is provided in two stages, with the outermost layer (i.e., furthermost away from the substrate) being only rhodium. In the first stage, either platinum or palladium or their mixture is provided on the coating, in any order individually or as a mixture, e.g., as from a common solution by impregnation. If provided as a mixture, rhodium would not be included in a platinum/palladium mixture. Then an overlayer of rhodium is provided on top of the platinum and/or palladium, the rhodium being used in this overlayer without any other precious metal included therewith. Rhodium provides a broadening of the NOx conversion window due to increased conversion efficiency of nitrogen oxides at higher temperatures. The under-coating of platinum and/or palladium preferably comprises 80 to 95% of the total precious metal loaded on the washcoat. When both platinum (Pt) and palladium (Pd) are used in the first coating under the rhodium, the ratio of Pt:Pd is preferably about 3:1 to 1:3.

The precious metals may be provided on the calcined oxide coating by any technique including the well known wet impregnation technique from soluble precious metal precursor compounds. Water soluble compounds are preferred, including, but not limited to nitrate salts and materials for platinum like chloroplatinic acid. As is known in the art, after impregnating the washcoat with the precursor solution, it is dried and heated to decompose the precursor to its precious metal or precious metal oxide. As is known in the art, the precursor may initially decompose to the metal but be oxidized to its oxide in the presence of oxygen. While some examples of precious metal precursors have been mentioned above, they are not meant to be limiting. Still other precursor compounds would be apparent to those skilled in the art in view of the present disclosure. In addition to this incorporation from a liquid phase, the precious metal, such as the platinum, may be provided by sublimation of platinum chloride or other volatile platinum salts: by solid state exchange in the 300–500° C. temperature range using labile platinum compounds. There is no criticality to the type of precursor compound that may be used to provide the precious metal according to this invention. The platinum and/or palladium that are provided under the rhodium layer may be provided separately or as a mixture, as from a single solution mixture of the two, but in the latter case rhodium would not be included in the mixture. Rather, the rhodium is provided only as an overlayer by itself.

As disclosed above, the present invention method provides a durable catalyst which is able to efficiently convert exhaust gas components using a catalyst which contains significantly less precious metal and at hence lower cost than conventional highly loaded three-way precious metal catalysts. This is believed to be the result of including aluminum and rare earths in a mixed metal oxide where the rare earths are in high proportion. That is, it is believed by the inventors that the unexpectedly good properties (e.g., high conversion, high durability) of the invention catalyst are due in large part to the close atomic proximity of the aluminum and rare earth metals in a mixed metal oxide. Further, it is believed by the inventors that by providing platinum and/or palladium specifically overcoated with rhodium allows maximum use of a significantly smaller amount of total precious metal, as compared to conventional three-way catalysts, while still providing excellent exhaust gas conversion. That is, by fixing the precious metals in this particular way, the exhaust gases first contact the rhodium which strongly initiates the reduction of NOx. This reduction thus takes place ahead of the oxidation of HC and CO by the other precious metals. Hence the HC and CO are somewhat available to aid in the reduction of NO since they are primarily converted by the platinum and palladium as the gases diffuse into the catalyst washcoat. As described above, NOx conversion is the most difficult aspect of exhaust gas treatment. This arrangement of precious metals thereby are believed to increase the NOx conversion efficiency. Furthermore, palladium is known to be especially susceptible to sulfur poisoning. By overcoating it with rhodium this susceptibility is reduced. Hence, the efficiency of the entire catalyst is maintained. Neither the validity nor understanding of the theory provided above are necessary however for practice of the invention. Rather, it is provided herein in an attempt to explain the unexpectedly excellent catalytic properties of the invention catalyst as is shown in the examples.

The catalyst is expected to be used in automotive vehicles for emission treatment in the exhaust gas system where it functions to oxidize hydrocarbons, carbon monoxide, and simultaneously reduce nitrogen oxides to desired emission levels as for example in South American countries or in Asian countries. In these applications it is more than sufficient to meet the emission standards. In other situations where the catalyst would not be sufficient by itself to meet emission standards, for example as might be the case in the United States, the invention catalyst may be used in combination with another emission control catalyst. One such application involves the use of the invention catalyst downstream of another three-way catalyst either as a separate stage or as a separate brick in the same converter. Hence, the use of the present invention catalyst is not limited to a particular application.

EXAMPLE 1

This example describes preparation of catalyst useful to treat gasoline exhaust gases according to an embodiment of the present invention. 10 kg of $Al(NO_3)_3$, 3.8 kg of $La(NO_3)_3 \cdot 6H_2O$, and 3.8 kg of $Ce(NO_3)_3 \cdot 6H_2O$ is dissolved in 200 liter deionized water, while stirring continuously until completely dissolved. An aqueous solution of $NH_4OH$ (35% wt.) is added slowly while stirring continuously, and the pH of the liquid is adjusted to about pH=9.0 with the ammonium hydroxide. The aluminum, lanthanum, and cerium all co-precipitate in their hydroxide form. The mixed hydroxides are allowed to set for about 24 hours. The precipitate is filtered and rinsed with deionized water 5 times. The filtrate is then calcined at 450° C. for 3 hours which decomposes the hydroxide precipitate to the mixed metal oxide, in this case being oxide of aluminum, cerium, and lanthanum. Based on their oxides, as described above, this mixed metal oxide contains 44.8 wt. % $Al_2O_3$; 28.4 wt % $CeO_2$; and 26.8 wt. % $La_2O_3$. These weight percents are obtained from calculations as follows:

$$W(kg)_{Al2O3}=W(kg)_{Al(NO3)3} \times MW_{Al2O3}/2MW_{Al(NO3)3}=10 \text{ kg} \times 102/426=2.39 \text{ kg};$$

$$W(kg)_{La2O3}=W(kg)_{La(NO3)3 \cdot 6H2O} \times MW_{La2O3}/2MW_{La(NO3)3 \cdot 6H2O}$$
$$=3.8 \text{ kg} \times 326/866=1.43 \text{ kg};$$

$$W(kg)_{CeO2}=W_{Ce(NO3)3 \cdot 6H2O} \times MW_{CeO2}/MW_{Ce(NO3)3 \cdot 6H2O}=3.8 \text{ kg} \times 172/434=1.51 \text{ kg}.$$

The oxide is transferred to a ball milling machine where it is ball-milled in water for about 72 hours when the particle size is about 800 Angstroms, on average. The density of the slurry is then adjusted to a concentration of 200 g/l with water. The slurry is then ready for coating a substrate.

A monolithic honeycomb substrate with 400 cell/in$^2$ is dipped into the slurry made above, while moving the substrate up and down, for 30 seconds. The substrate is pulled out and blown with pressurized air to remove excess washcoat slurry. The substrate with washcoat slurry is then dried at 110–150° C. in air for 2 hours and subsequently calcined in a tunnel furnace at 700° C. for 2 hours. The washcoat layer on the substrate is about 15 wt. %, based on the weight of the substrate.

To provide the precious metal on the washcoat, Pt, Pd, Rh precursor salts (i.e., respectively, $H_2PtCl_6$, $H_2PdCl_4$, $H_3RhCl_6$) are dissolved separately in deionized water to make 200 g/l concentrations of each, i.e., the concentration based on the weight of the precious metal. Equal volume amounts of Pt and Pd precursor solutions are mixed and used to impregnate the substrate. After impregnation, the washcoat is dried at 110° C. and then the precious metal precursor deposited is reduced to the metallic state of the precious metal by calcining at 500° C. for 3 hours in a $H_2+N_2$ mixture. The result is that 14 g/ft$^3$ each of Pt and Pd are loaded on the substrate through the impregnation. After being cooled down, 1.6 g/ft$^3$ of Rh is similarly impregnated onto the catalyst loaded with Pt and Pd from the solution made above. The catalyst is then dried at 110° C. and subsequently calcined at 500° C. for 1 hour. This invention catalyst is labeled Cat. #1 in FIG. 1.

EXAMPLE 2

This example is made for comparison with the catalyst of Example 1. In the Example 1 invention embodiment catalyst, a mixed metal oxide is made by co-precipitation while in this example, in contrast, the oxide is made by direct mechanical mixing of aluminum oxide and rare earth oxides. The amounts of aluminum oxide and rare earth oxides are the same in both examples.

γ-$Al_2O_3$ (1 kg), $La_2O_3$ (0.60 kg), and $CeO_2$ (0.63 kg) are mixed in 8 liters of deionized water in a ball miller. The oxides are milled in this slurry for 72 hours and then the slurry is adjusted with water to a density of 200 g/l. The slurry is ready for coating the substrate.

Following the procedure of Example 1, a substrate is washcoated with the comparison slurry prepared above and impregnated with precious metals exactly the same way as described in Example 1. The catalyst thus prepared is labeled as Cat. #2 in FIG. 1.

Testing of Cat. #1 and Cat. #2

Cat. #1 and Cat. #2 prepared from Examples 1 and 2, respectively, are tested in a flow reactor for their light-off temperature (the temperature at which the conversion of a species in exhaust gas such as CO, HC, or NO reaches 50%). To carry out this testing, Cat.1 #1 and Cat. #2 are cut into small bricks with 38 mm diameter and 20 mm in length. A simulated gas mixture with 0.5% $H_2$, 1.3% $O_2$, 1.5% CO, 1000 ppm $C_3H_6$, 500 ppm $C_3H_8$, 900 ppm NO, 2.5% $H_2O$, and $N_2$ balance (all in volumatic) is passed through the brick at a space velocity of 55,000 $hr^{-1}$. The furnace ramping rate is at 10° C. /min. The light-off behavior of the two catalysts with respect to CO is shown in FIG. 1. From this figure, it can be seen that Cat. #1 desirably has a significantly lower light-off temperature of about 240° C., while Cat. #2 has a light-off temperature of about 280° C.

EXAMPLE 3

This example describes several catalysts (B, C, D, E) made according to embodiments of the present invention, however, each with different total amount loadings of precious metals. One catalyst is made with the same washcoat as the others but without any precious metal for comparison (Example A).

First a mixed metal oxide is made by co-precipitation from 4.2 kg of $Al(NO_3)_3$, 0.7 kg of $La(NO_3)_3 \cdot 6H_2O$, 0.7 kg of $Ce(NO_3)_3$ following the procedure described in Example 1. The mixed metal oxide thus made is mixed with 3 wt. % $ZrO_2$ and 1 wt. % BaO (stabilizers) in a ball mill and a slurry made as in Example 1. The slurry is washcoated and fixed on five honeycomb substrates according to the technique described in Example 1. The final washcoat on each of these substrates is 10 wt. % of the total weight (i.e., based on the weight of substrate).

Four different amounts of total precious metal (PM), all however being in the ratio of Pt:Pd:Rh=7:3:2 by weight, are then loaded by impregnation on substrates washcoated with oxide described above. These four catalysts are designated B, C, D, and E and the total precious metal loadings are shown in Table 1 below. Catalyst A is prepared for comparison and uses no precious metal on the washcoated substrate. The procedure used to impregnate the precious metals into the other catalysts is that described in Example 1. Then the relationship of precious metal loading to the conversion efficiency of CO is tested using mixed gas described above for Examples 1 & 2. The testing is carried out at a constant temperature of 400° C. and 55,000 $hr^{-1}$ space velocity. The results are shown as Table 1.

TABLE 1

| Cat. # | A | B | C | D | E |
|---|---|---|---|---|---|
| PM g/ft³ | 0 | 5.6 | 11 | 16 | 28 |
| % CO Conv | 20 | 25 | 90 | 95 | 99 |

Testing of Catalyst C

Catalyst C, both a fresh and an aged sample, are also tested for three-way catalyst activity via the laboratory redox sweep test described in SAE paper 760201 by Gandhi, et al. entitled "Laboratory Evaluation of Three-Way Catalysts". In these Redox sweep tests, the redox ratio $R=(P_{CO}+P_{H2}+9C_3H_6+10\ C_3H_{10})/(P_{NO}+2P_{O2})$, where R>1 represents an overall reducing gas mixture, R=1 a stoichiometric gas mixture, R<1 an overall oxidizing gas mixture.

In the tests, the gas mixture is composed of 1 % CO, 0.33% $H_2$, 1000 ppm $C_3H_6$, 500 ppm $C_3H_8$, 1000 ppm NO, 20 ppm $SO_2$, 12% $CO_2$, 10% $H_2O$, 0.6–1.3% $O_2$ depending on the R value, and the balance of $N_2$. The test temperature was at 400° C., and the space velocity was at 40 000 $hr^{-1}$.

The thermally aged sample is aged in a pulse flame combustor (pulsator) described in SAE 962118 by Hepburn et. al. entitled "The Pulse Flame Combustor Revisited". The pulsator burns isooctane fuel doped with 200 ppm sulfur. The catalyst is aged at 850° C. for 12 hours. It is aged under a three mode cycle beginning with 20 minutes stoichiometric, followed by 20 minutes lean, and 20 minutes rich combustion exhaust.

Figure 2:
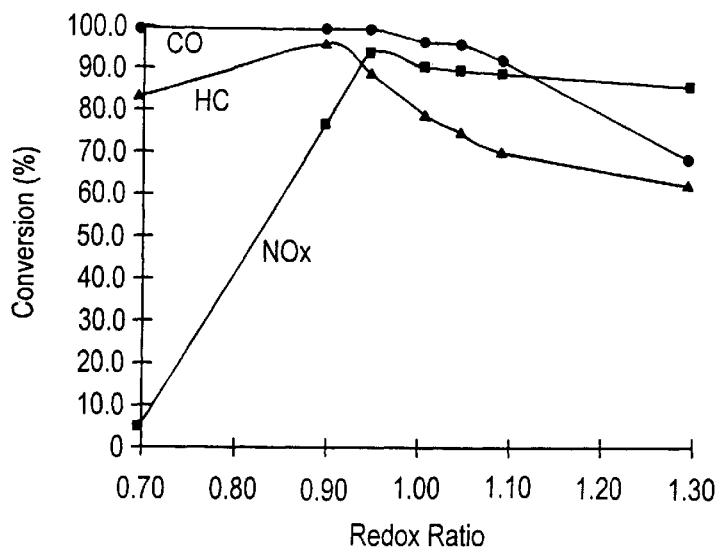
FIG. 2 is a graph which shows CO, HC, and NOx conversion at various redox ratios for a fresh catalyst made by a preferred embodiment of the present invention.
Figure 3:
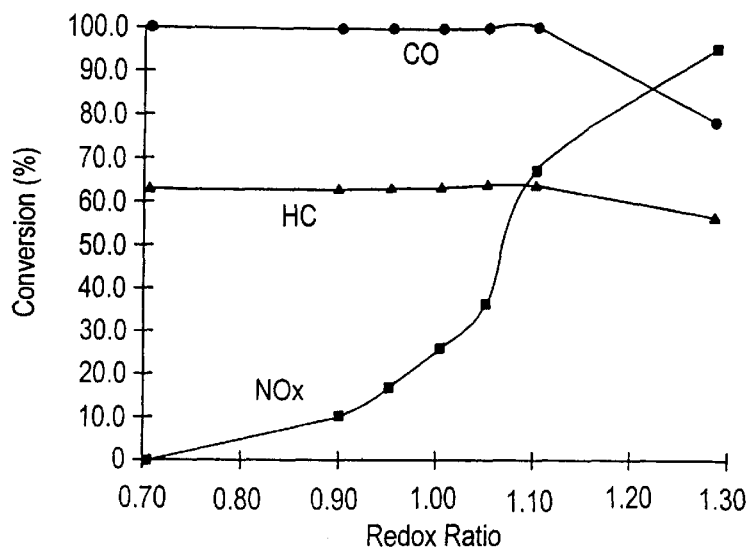
FIG. 3 is a graph which shows CO, HC, and NOx conversion at various redox ratios for the FIG. 2 catalyst after it is aged.

The R-sweep test results with a fresh and an aged catalyst sample of catalyst C (prepared above) are shown as FIG. 2 and FIG. 3, respectively. It can been seen that the fresh catalyst demonstrates a high conversion for all three species of HC, CO, and $NO_x$ near the stoichiometric. The aged catalyst also demonstrate high conversion for CO and NOx near the stoichiometric condition. The HC conversion is between 60–70 % under the test condition. However, as shown below, the catalyst still significantly exceeds minimum emission standard requirements.

Testing of Catalyst E vs. Commercially Available Catalysts

Two catalyst bricks (each being 105 mm diameter ×110 mm length) using the sample E formulation are canned to form a converter which is mounted in the under-body position of a vehicle Flagship CA 7160E (known as Hongqi in Chinese, First Automobile Co, Changchun, China). The Flagship has a 1.6 liter engine equipped with electric fuel injection (EFI) and heated exhaust gas oxygen (HEGO) sensor. Using a drive cycle of MVEuro (with 40 seconds idle), the vehicle test results are shown in Table 2 below.

Also tested in the same manner are two commercially available catalysts (Com. I and Com. II) with significantly higher precious metal loading than the invention catalyst. Catalyst volume, canning and mounting of these commercial catalysts are the same as the catalyst E from this invention.

TABLE 2

|  | ECE R83.01 | Measured Emissions g/kg | | |
|---|---|---|---|---|
|  | (g/kg) | Cat. E | Com. I | Com. II |
| P.M. g/ft³ |  | 28 | 50 | 40 |
| CO | 3.16 | 2.1 | 2.37 | 2.84 |
| HC + NOx | 1.13 | 0.52 | 0.66 | 0.64 |

From Table 2, it can be seen that in addition to invention catalyst E meeting the emission standard of ECE R8301, the activities for CO, HC and NOx with catalyst E are even significantly higher than those catalyst with much higher precious metal loading. That is, catalyst E removes more of the CO, HC and NOx materials from the exhaust gas than do either of the commercially, more highly loaded precious metal catalysts I and II, which was unexpected by the inventors. In the industry, it is expected to be the reverse since increased precious metal loading is commonly associated with improved exhaust gas conversion. Not only is the invention catalyst superior in performance, it would be less costly since it has a lower precious metal loading.

We claim:

1. A method for manufacturing a three-way catalyst useful for treating gasoline engine exhaust gases operated near stoichiometric A/F ratios and containing hydrocarbons, carbon monoxide, and nitrogen oxides (NOx), the steps comprising:

coating a substrate with about 10–30 wt. %, based on the weight of the substrate, of oxide particles having a diameter, on average, of 200–900 Angstroms and comprising: (1) a mixed metal oxide and, optionally, (2) 0 to 8 wt. % oxide stabilizers based on the weight of the mixed metal oxide, the metals being present in the lattice of the mixed metal oxide consisting essentially of aluminum and rare earth metals, the rare earth metals comprising cerium (Ce) and lanthanum (La), and calculating La as $La_2O_3$, Ce as $CeO_2$ and Al as $Al_2O_3$, the La is 40–70 wt. % of La+Ce and the rare earth metals are 20–60 wt. % of the weight of the Al+rare earth metals, said oxide being made from a solution of soluble salts of the metals by co-precipitation thereof forming a metal hydroxide which is calcined at temperatures up to about 500° C. to decompose said hydroxide and form said oxide; and depositing precious metal on the oxide coating, wherein first at least one precious metal selected from the group consisting of platinum and palladium is deposited and then an overlayer of rhodium is deposited, in an amount of about 5–35 $g/ft^3$ based on the volume of the substrate.

2. The method according to claim 1 wherein said oxide coating is provided on said substrate from a slurry of the stabilizer and mixed metal oxide.

3. The method according to claim 1 wherein the weight ratio of platinum:palladium:rhodium in the catalyst is 7:3:2, respectively.

4. The method according to claim 1 wherein said catalyst comprises about 10–30 $g/ft^3$ of precious metal based on the volume of the substrate.

5. The method according to claim 4 wherein the precious metal is 10–16 $g/ft^3$.

6. The method according to claim 1 wherein said at least platinum is provided on said oxide coating prior to said rhodium overlayer.

7. The method according to claim 1 wherein said precious metal is deposited on said oxide coating by impregnation from a solution of precious metal precursors.

8. The method according to claim 1 wherein prior to deposition of said rhodium overlayer said deposited precious metal layer comprising at least one of platinum and palladium is subjected to a reducing atmosphere comprising at least nitrogen.

9. The method according to claim 8 wherein said reducing atmosphere further includes hydrogen.

10. The method according to claim 1 wherein the stabilizer is one or more materials selected from the group consisting of calcium oxide, barium oxide, titanium oxide, and zirconium oxide.

11. The method according to claim 1 wherein the weight ratio of platinum to palladium is 3:1 to 1:3.

12. The method according to claim 1 wherein the amount of platinum+palladium is 80–95 wt. % of the total precious metal.

13. The method according to claim 1 wherein said rare earth metals further include at least one of europium (Eu) and praseodymium (Pr) in an amount of up to 2 wt. % calculated as $Eu_2O_3$ and $PrO_2$.

14. A catalyst made according to the method of claim 1.

15. The catalyst according to claim 14 wherein the catalyst comprises about 10–30 $g/ft^3$ of precious metal based on the volume of the substrate.

16. A method for treating exhaust gas generated by a gasoline internal combustion engine which gases comprise hydrocarbons, carbon monoxide and nitrogen oxides, which method comprises the steps of:

locating a three-way catalyst in the exhaust gas passage of a gasoline internal combustion engine operated near stoichiometric A/F ratios, said catalyst comprising:

oxide particles coated on a substrate in an amount of 10–30 wt. %, based on the weight of the substrate, said particles having a diameter, on average, of 200–900 Angstroms and comprising a mixture of (1) a mixed metal oxide and, optionally, (2) 0 to 8 wt. % oxide stabilizers based on the weight of the substrate, the metals being present in the lattice of the mixed metal oxide consisting essentially of aluminum and rare earth metals, the rare earth metals comprising cerium (Ce) and lanthanum (La), and calculating La as $La_2O_3$, Ce as $CeO_2$ and Al as $Al_2O_3$, the La is 40–70 wt. % of La+Ce and the rare earth metals are 20–60 wt. % of the weight of the Al+rare earth metals, said oxide being made from a solution of soluble salts of the metals by co-precipitation thereof forming a metal hydroxide which is calcined at temperatures up to about 500° C. to decompose said hydroxide and form said oxide; and precious metal deposited on the oxide coating, wherein first at least one precious metal selected from the group consisting of platinum and palladium is deposited and then an overlayer of rhodium is deposited, in an amount of about 5–35 $g/ft^3$ based on the volume of the substrate; and contacting said catalyst with said exhaust gases.

17. The method according to claim 16 wherein at least platinum is lacated on said oxide coating under said rhodium overlayer.

18. The method according to claim 16 wherein the stabilizer is one or more material selected from the group consisting of calcium oxide, barium oxide, titanium oxide, and zirconium oxide.

* * * * *